United States Patent
Zeng et al.

(10) Patent No.: US 9,179,118 B2
(45) Date of Patent: Nov. 3, 2015

(54) TECHNIQUES FOR SYNCHRONIZATION OF AUDIO AND VIDEO

(75) Inventors: Shanjun Oak Zeng, Shanghai (CN); Keith Hazelet, Chandler, AZ (US); Tiehan Lu, Shanghai (CN); Liang Leon Cheng, Shanghai (CN); Jie Wu, Shanghai (CN)

(73) Assignee: Intel Corporation, Santa Clara, CA (US)

(*) Notice: Subject to any disclaimer, the term of this patent is extended or adjusted under 35 U.S.C. 154(b) by 79 days.

(21) Appl. No.: 13/976,119

(22) PCT Filed: May 12, 2011

(86) PCT No.: PCT/CN2011/073994
§ 371 (c)(1),
(2), (4) Date: Jun. 26, 2013

(87) PCT Pub. No.: WO2012/151756
PCT Pub. Date: Nov. 15, 2012

(65) Prior Publication Data
US 2013/0279888 A1 Oct. 24, 2013

(51) Int. Cl.
*H04N 5/85* (2006.01)
*H04N 9/87* (2006.01)
(Continued)

(52) U.S. Cl.
CPC .............. *H04N 9/87* (2013.01); *H04N 21/4307* (2013.01); *H04N 21/44004* (2013.01); *H04N 21/4305* (2013.01)

(58) Field of Classification Search
CPC ......... H04N 5/85; H04N 9/8042; H04N 9/87; H04N 9/8063; H04N 21/44004; H04N 21/4307; H04N 21/4305; G11B 27/034; G11B 27/105
See application file for complete search history.

(56) References Cited

U.S. PATENT DOCUMENTS

| 5,430,485 A | 7/1995 | Lankford |
| 5,771,075 A | 6/1998 | Rim |

(Continued)

FOREIGN PATENT DOCUMENTS

| CN | 1902941 A | 1/2007 |
| CN | 101197993 A | 6/2008 |

(Continued)

OTHER PUBLICATIONS

International Preliminary Report on Patentability received for PCT Patent Application PCT/CN2011/073994, mailed on Nov. 21, 2013, 7 pages.

(Continued)

*Primary Examiner* — William C Vaughn, Jr.
*Assistant Examiner* — Eileen Adams
(74) *Attorney, Agent, or Firm* — Green, Howard & Mughal, LLP (57) ABSTRACT

Techniques are described for determining whether a stream is in a stable state and permitting adjustment of the PTS value when the stream is in a stable state. The stream can be in a stable state when PTS values received over a period of time do not change unexpectedly. For example, when the stream is in a stable state, the PTS value for audio or video can be adjusted based on system buffer levels, i.e., over flow or under flow. The amount of adjustment of the PTS value can be based on whether the buffer level appears to be moving into greater overflow or underflow. In some cases, when the stream is not in a stable state, the audio is permitted to be played back at a sample rate and video is permitted to be played back at a frame rate instead of being controlled by PTS.

11 Claims, 7 Drawing Sheets

(51) Int. Cl.
*H04N 21/44* (2011.01)
*H04N 21/43* (2011.01)

(56) References Cited

U.S. PATENT DOCUMENTS

| | | | |
|---|---|---|---|
| 6,510,279 B1 | 1/2003 | Morishita | |
| 2006/0209684 A1* | 9/2006 | Bei | 370/229 |
| 2009/0241163 A1* | 9/2009 | Seo | 725/139 |
| 2010/0142927 A1* | 6/2010 | Lim et al. | 386/96 |
| 2011/0138427 A1* | 6/2011 | Shen et al. | 725/62 |
| 2012/0179422 A1* | 7/2012 | Webb et al. | 702/187 |

FOREIGN PATENT DOCUMENTS

| | | |
|---|---|---|
| CN | 101394469 A | 3/2009 |
| CN | 101478683 A | 7/2009 |
| WO | 2006/067374 A1 | 6/2006 |
| WO | 2012/151756 A1 | 11/2012 |

OTHER PUBLICATIONS

International Search Report and Written Opinion received for PCT Patent Application PCT/CN2011/073994, mailed on Feb. 23, 2012, 10 pages.

* cited by examiner

TECHNIQUES FOR SYNCHRONIZATION OF AUDIO AND VIDEO

FIELD

The subject matter disclosed herein relates generally to synchronization of audio and video during audio rendering and video playback.

RELATED ART

Audio-video synchronization attempts to render audio at proper times during video playback. For example, audio and video data can be stored in local storage medium such as hard disk, DVD, Blue Ray disk, or transmitted through an IP network, cable, or satellite. For example, U.S. Pat. Nos. 5,430,485; 5,771,075; and 6,510,279 illustrate examples of traditional audio-video synchronization.

Figure 1:
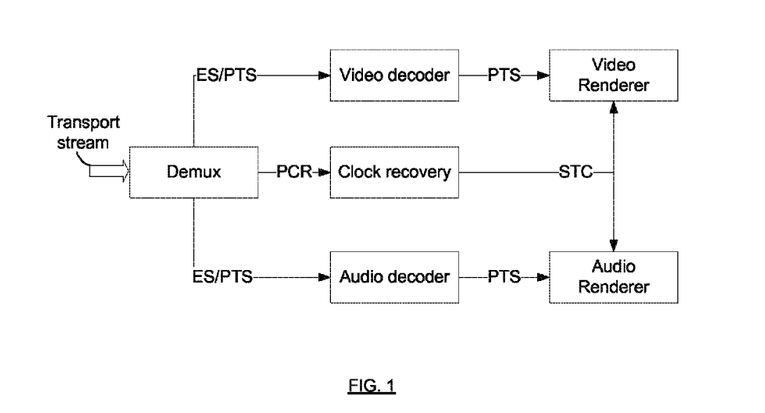
FIG. 1 illustrates an example of a conventional technique for audio-video synchronization.

FIG. 1 illustrates an example of a conventional technique for audio-video synchronization. De-multiplexer (Demux) receives multiplexed audio and video signals in a transport stream. The transport stream can be in compliance with ISO/IEC 13818-1: 1994. In FIG. 1, ES stands for elementary stream, which includes video and audio parts and is defined in ISO/IEC 13818-2 (video part) and 13818-3 (audio part). Demux extracts timing information such as program clock recovery (PCR) and presentation timestamp (PTS) from a transport stream. PCR information can be used to recover the local system time clock (STC). Received video frames and audio samples each have associated PTS. A PTS indicates a presentation time of a video frame or audio sample. When the STC matches a PTS for a video frame, the video frame is displayed and when the STC matches a PTS for an audio sample, the audio sample is rendered. Audio-video synchronization occurs when the audio PTS value matches the STC value and the video PTS matches the STC value. However, there are several potential issues with this technique for audio-video synchronization.

A first potential issue is audio-video synchronization can be disrupted by a wrong PCR value when a time-base discontinuity occurs. Under ISO/IEC 13818-1 (1994), a system time-base discontinuity bit value of 1 indicates that a PCR discontinuity has occurred. For example, a system time-base discontinuity can be indicated by the use of the discontinuity_indicator=1 in the transport stream packets of a PID designated as a PCR_PID (see, e.g., page 42 of ISO/IEC 13818-1 (1994)). Regardless of whether discontinuity_indicator=1 or 0, when a discontinuity occurs, the next PCR/PTS in a transport stream packet represents a sample of a new system time clock. The PCR value can be wrong for a variety of reasons. For example, a PCR value can be changed by distortion such as noise or signal corruption during network transmission or the encoder can have an error and transmits the wrong PCR value.

A traditional method of dealing with PCR discontinuity is for a de-multiplexer to calculate the PCR jump amount and re-base the PTS value using this PCR jump amount by adding the PCR jump amount to the PTS. A potential issue with this method is that, in some cases, the offset calculated using the PCR is irrelative to PTS discontinuity. In other words, using the PCR jump amount does not sufficiently correct the PTS value to maintain or achieve audio-video synchronization. Thus, using the re-based PTS to accomplish audio-video synchronization can cause video freeze or audio glitches.

A second potential issue is that audio glitches or video freeze can be caused by system buffer under or overflow. A system buffer can be used by demux, video and audio decoder, and/or video and audio renderer. Under or overflow can occur in the case of variable stream input bit rate such as IPTV environment where the network jitters may happen. The system architecture of FIG. 1 does not determine the amount of PTS re-basing in the event of buffer under or overflow.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Various embodiments provide a manner of determining whether a presentation timing module is in a stable state and permitting adjustment of the PTS value when the presentation timing module is in a stable state. The presentation timing module can be in a stable state when PTS values received over a period of time do not change markedly. For example, when the presentation timing module is in a stable state, the PTS value for audio or video can be adjusted based on system buffer levels, i.e., over flow or under flow. The amount of adjustment of the PTS value can be based on whether the buffer level appears to be moving into greater overflow or underflow. In some cases, when the presentation timing module is not in a stable state, the audio is permitted to be played back at a sample rate and video is permitted to be played back at a frame rate instead of being controlled by PTS.

Illustrations are provided with regard to a presentation timing module and decisions of whether to adjust a PTS value can be made based on whether the presentation timing module is in a stable state. However, in some embodiments, rather than a state of a presentation timing module, decisions of whether to adjust PTS values can be made based on audio or video PTS values received over a period of time have not changing beyond a threshold.

Figure 2:
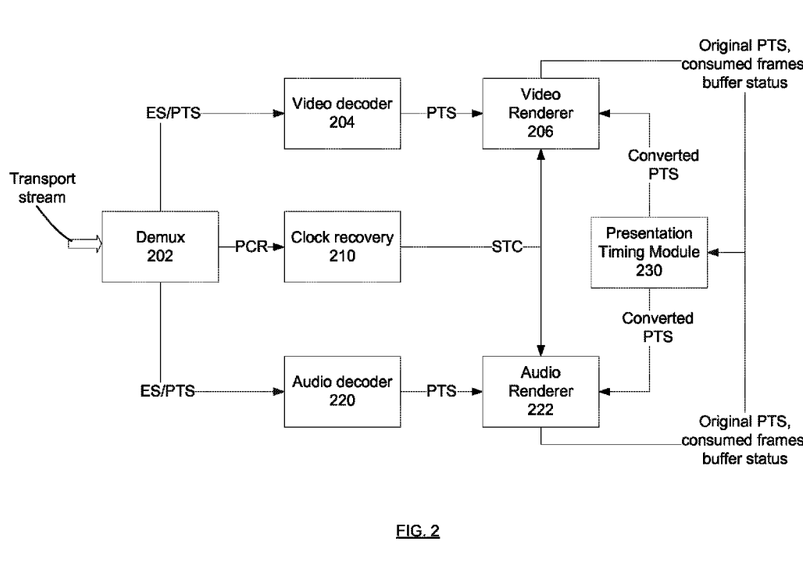
FIG. 2 depicts an example system that can be used to perform audio-video synchronization.

FIG. 2 depicts an example system that can be used to perform audio-video synchronization. Demux 202 can receive a transport stream that includes audio and video portions. The transport stream can be in compliance with MPEG-2 (ISO/IEC 13818-1: 1994), although the stream can be in compliance with other standards, such as but not limited to MPEG-1, MPEG-4, H.263, H.264, H.265, VC1, and VP8. Demux 202 can parse the original PTS, determine its arrival time and tag that information onto the associated buffer. Demux 202 can also initialize buffering for push mode playback (tuner or UDP playback) and local file playback. Demux 202 may provide a video part of an elementary stream (ES) as well as related presentation timestamps (PTS) to video decoder 204. Demux 202 may provide an audio part of an elementary stream (ES) as well as related presentation timestamps (PTS) to audio decoder 220.

Video decoder 204 may perform video decoding in accordance with applicable video decoding standards such as but not limited to MPEG-1, MPEG-2, MPEG-4, H.263, H.264, H.265, VC1, and VP8. For example, video decoding can include parsing the compressed stream using variable length decoding (VLD), performing inverse quantization (IQ), performing inverse discrete cosine transformation (IDCT), performing motion compensation (MC) and block reconstruction (BR). Video renderer 206 may receive decoded video as well as PTS for video from video decoder 204. Video renderer 206 provides video for playback. Video frames can be stored in a frame buffer and then a graphics engine can provide the frames to a display. Video renderer 206 may provide video PTS as well as number of displayed frames (shown as "consumed frames") and buffer status of the frame buffer of video renderer 206 to presentation timing module 230.

A renderer can call presentation timing module 230 every time it has a frame with PTS. A frame's rendering time can be calculated by the current stream time plus a compensation. The compensation can be defined as the duration of frames which is processed by render timing but not yet displayed by display device.

Audio decoder 220 may perform audio decoding in accordance with applicable audio decoding standards such as but not limited to MPEG-1, MPEG-2, MPEG-4, H.263, H.264, and H.265. Audio renderer 222 may receive decoded audio as well as PTS for audio from audio decoder 220. Audio renderer 222 may provide audio for playback. For example, audio can be available to audio hardware output for speakers and/or headphones. Audio renderer 222 may provide audio PTS as well as a number of consumed audio samples (shown as "consumed frames") and status of the buffer of audio renderer 222 to presentation timing module 230.

Clock recovery block 210 may generate a system time clock (STC) based on program clock recovery (PCR) extracted from the received transport stream.

Presentation timing module 230 can potentially adjust received video or audio PTS values and provide adjusted video PTS values to video renderer 206 and adjusted audio PTS values to audio renderer 222. If the presentation timing module is in a STABLE or continuous state, the PTS value can be adjusted. Presentation timing module 230 can be in a stable or unstable state depending on changes in the PTS values received with audio and video streams. For example, if changes between received PTS values are less than a threshold, presentation timing module 230 can be in a stable state. If changes between received PTS values are more than a threshold, presentation timing module 230 can be in an unstable state.

If the presentation timing module is in DISCONTINUITY or discontinuous state, then received PTS value could be wrong, which can cause audio loss or video freeze if the received PTS value is used for audio-video synchronization. In DISCONTINUITY or discontinuous state, audio is permitted to be played back at a sample rate and video is permitted to be played back at a frame rate instead of being controlled by PTS. In the DISCONTINUITY or discontinuous state, both audio and video can be played back, but no audio-video synchronization may be attempted. For example, when discontinuity is detected, presentation timing module 230 can set the adjusted PTS to invalid value (for example, −1 or 0xFFFFFFFF). When video renderer 206 or audio renderer 222 recognize this invalid PTS, they can provide play back at sample rate or frame rate.

$PTS_n$ represents a PTS extracted from an input stream for either video or audio and n represents a number of received PTS. $PTST_n$ represents a theoretical PTS value. For video, $PTST_n$ can be determined by a number of frames displayed previously divided by the frame rate. For example, if number of displayed frames is 500 and the frame rate is 25 fps, the theoretical PTS value is 500/25=20. For audio, $PTST_n$ can be determined by a number of samples rendered previously divided by the audio sample rate. $Delta_n$ can represent a difference between the $PTS_n$ and $PTST_n$. $Delta'_n$ can represent a difference between two consecutive $Delta_n$.

Presentation timing module 230 can enter a stable state when N consecutive Delta'n are smaller or equal to a threshold. Value N can be 10 or other numbers. Presentation timing module 230 enters a discontinuity state when one Delta'n is larger than a threshold. Presentation timing module 230 can re-enter stable state after N consecutive Delta'n are smaller or equal to a threshold.

Presentation timing module 230 can expose a PTS conversion API, which can be called by a renderer.

Figure 3:
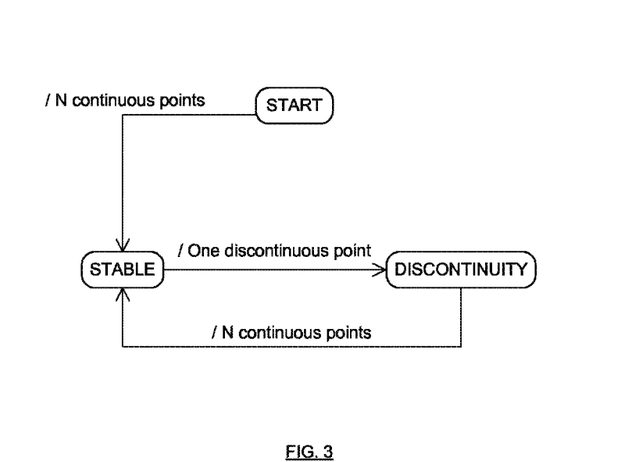
FIG. 3 depicts an example state diagram of continuous and discontinuous states of a presentation timing module.

FIG. 3 depicts an example state diagram of continuous and discontinuous states for the presentation timing module of FIG. 2. Either a video discontinuity or audio discontinuity can make the presentation timing control module enter DISCONTINUITY state. After presentation timing control module enters DISCONTINUITY state, both audio and video can be free running at their sample rate or frame rate.

Various embodiments provide a manner to adjust PTS values based on system buffer levels. When the stream is in stable state and system buffer over or under flow is detected, presentation timing module (FIG. 2) can adjust the PTS value for both video and audio. Original PTS values are sent to presentation timing module and the presentation timing module potentially provides adjusted PTSs.

For video, undertow can be defined as a large number of consecutive frames with late timestamps without any "on-time" frames in between. The large number can be as large as the worst-case temporal encoding structure supported by the video decoder, such as 16 in the case of H.264. For audio, underflow can be described as a number of consecutive audio frames with late timestamps without any "on time" frames in between. The number depends on the audio internal pipeline and may not be larger than 2 or 3.

System buffer level is provided to presentation timing module 230 before a renderer is to perform a PTS conversion. Renderers may perform a PTS conversion in response to receipt of a PTS. When the presentation timing module enters the STABLE state, the system buffer level information can be determined so the stable buffer level is known. Buffer level can be expressed as the percentage of the buffer used compared to the buffer capacity.

When system input or output exception happens, for example, due to network jitter, the system buffer level change can be detected. For example, if the buffer level is at underflow and the buffer level is decreasing, an adjustment factor is added to the converted PTS. Increasing the PTS causes slower data consumption because if the PTS is greater than the system clock, rendering is slowed down. If the buffer level is at overflow and the level is increasing, an adjustment factor is subtracted from the converted PTS. Decreasing the PTS can cause faster data consuming because if the PTS is less than the system clock, rendering is sped up.

Figure 4A:
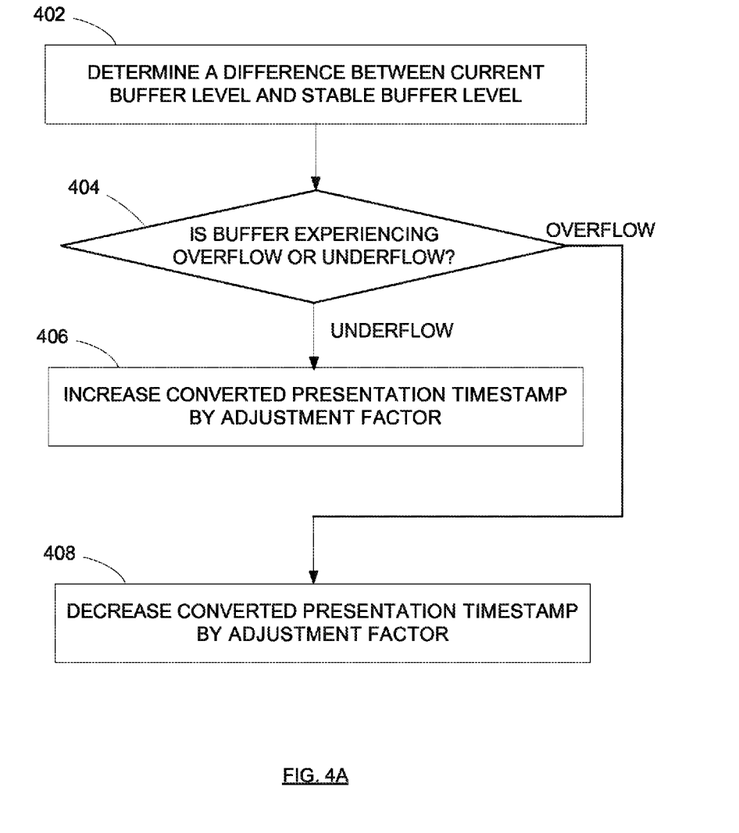
FIGS. 4A and 4B depict example processes that can be used to modify a presentation time stamp.

FIG. 4A depicts an example process that can be used to modify a presentation time stamp. Prior to performing the process of FIG. 4A, a buffer level of a renderer (audio or video) can be determined when the presentation timing module is in the stable state. Hereafter, the system buffer level determined when the presentation timing module enters a stable state or is in a stable state can be referred to as the "stable buffer level." Block 402 includes determining a difference between a current buffer level and the stable buffer level. Block 402 can be performed in response to receipt of an audio or video presentation time stamp at a renderer or presentation timing module. The buffer in blocks 402 and 404 can be associated with an audio or video renderer associated with the received audio or video presentation time stamp that triggered block 402. Block 404 includes determining whether a buffer underflow or overflow is taking place. If the current buffer level is less than the stable buffer level by more than a threshold and the current buffer level is decreasing, the buffer is considered in an underflow state. If the current buffer level is greater than the stable buffer level by more than a threshold and the current buffer level is increasing, the buffer is considered in an overflow state. In the case of an underflow, block 406 follows block 404. In the case of a buffer overflow, block 408 follows block 404. In block 406, for a buffer underflow, an adjustment factor is added to the PTS to increase converted PTS to cause slower reading out. In block 408, an adjustment factor is subtracted from the converted PTS to decrease PTS and cause faster buffer read out. A converted PTS can be determined by subtracting the Delta$_n$ from PTS$_n$.

Figure 4B:
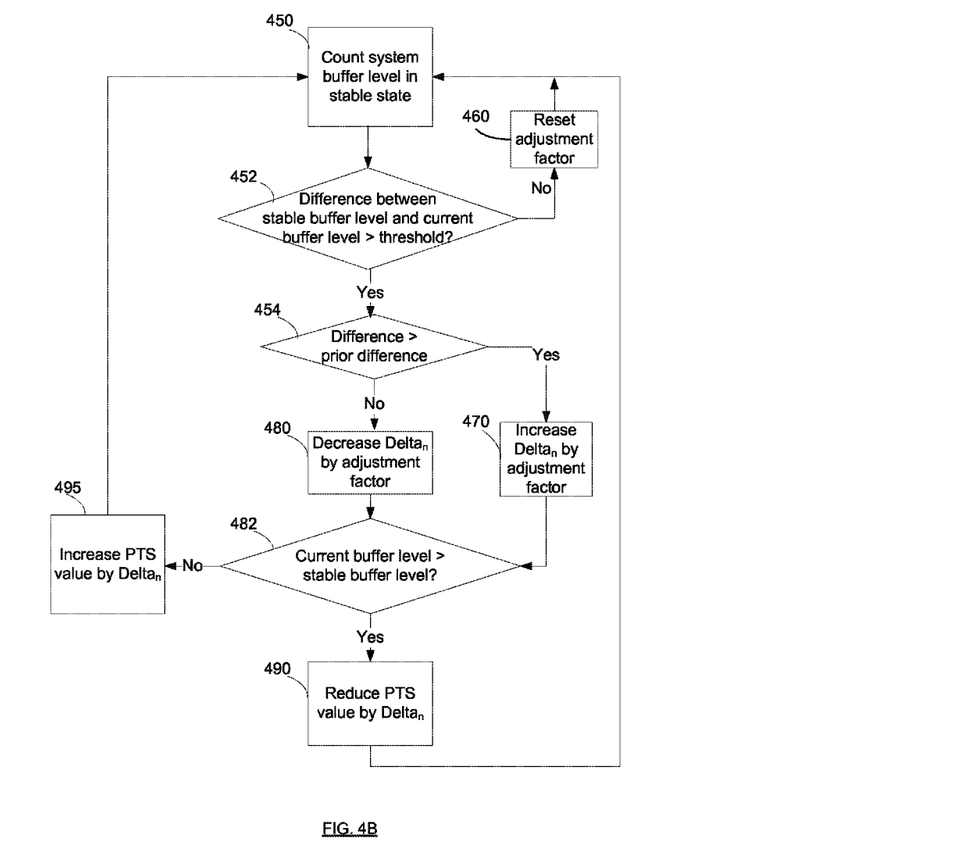

FIG. 4B depicts an example manner to adjust a presentation timestamp. When either video renderer's buffer or audio renderer's buffer enters unhealthy status (e.g., undertow or overflow), an update of an adjustment factor can occur. The same adjustment factor can be used to adjust both video and audio PTS. If video PTS is adjusted for a certain amount, audio PTS can be adjusted that same amount to potentially maintain audio/video synchronization. Use of the adjustment can stop after both audio renderer and video renderer buffers enter healthy status (i.e., no overflow or underflow).

One possible objective of the process of FIG. 4B is to keep the PTS translation as smooth as possible. A large modification to the PTS can cause a display artifact or audio glitch. When a system buffer is trending to overflow or underflow, the process of FIG. 4B attempts to stop the trend by adjusting PTS. The initial adjustment can be a relatively small amount. After adjustment, if the buffer level trends away from healthy status, the adjustment factor will be increased to reduce the time to reach healthy status. After adjustment, if the buffer level is trending toward healthy status, the adjustment factor is decreased. When the buffer enters healthy status again, the adjustment factor is reduced to a small value again.

Block 450 includes determining the system buffer level when the presentation timing module is in a stable state. This stable buffer level can correspond to neither overflow nor underflow state. For example, when the presentation timing module enters a stable state, the system buffer level can be determined for video renderer buffer or audio renderer buffer. This buffer level can correspond to a buffer level that is neither overflow nor underflow. On each arrival of a PTS at a video renderer, the video renderer may make the current system buffer level of the buffer used by the video renderer (shown as "buffer status" in FIG. 2) available to presentation timing module 230 along with the PTS value. On each arrival of a PTS at an audio renderer, the audio renderer may make the current system buffer level of the buffer used by the audio renderer (shown as "buffer status" in FIG. 2) available to presentation timing module 230 along with the PTS value. The current buffer level for either audio renderer or video renderer is compared to the corresponding stable buffer level. Block 452 includes determining whether an absolute difference between the stable buffer level and the current buffer level is greater than a threshold. If the absolute difference is greater than a threshold, then block 454 follows block 452. If the absolute difference is not greater than a threshold, then block 460 follows block 452.

Block 460 includes resetting the adjustment factor value. The initial adjustment factor value can be zero or a small value determined from experimental usage. When difference between the buffer level and the stable buffer level is not greater than the threshold, the buffer level is considered healthy, and the adjustment factor value will be reset to zero or a small value determined from experimental usage. When the system buffer level (both audio and video buffer level) are both in healthy status, there is no need to adjust PTS using the adjustment factor. The adjustment factor can be reset to minimize adjustment of the PTS were the PTS to be adjusted when both audio and video buffer levels are in healthy state.

Block 454 includes determining whether the absolute difference is greater than a prior absolute difference. The prior absolute difference can be between an immediately prior or prior buffer level and the stable buffer level. If the difference is greater (or increasing), then block 470 follows block 454. If the difference is greater (or increasing), the buffer level condition is increasing in underflow or overflow. If the difference is not greater (or staying steady or decreasing), then block 480 follows block 454. If the difference is not greater (or staying steady or decreasing), the buffer level condition is becoming less underflow or overflow.

Block 470 includes increasing Delta$_n$ by an adjustment factor. After prior adjustment, if the buffer level continues to trend away from healthy status, the Delta$_n$ will be increased to reduce the time to reach healthy status. The Delta$_n$ can be increased because the buffer level is trending to more underflow or overflow. Adjustment using a higher Delta$_n$ can provide faster movement of the buffer level closer to healthy level. The adjustment factor value can be set based on experimental results and can be determined by how much buffer is used in the system.

Block 480 includes decreasing Delta$_n$ by an adjustment factor. The Delta$_n$ can be decreased by the adjustment factor because the buffer is trending away from underflow or overflow and toward healthy level. Reducing the Delta$_n$ can prevent over adjusting the PTS value and potentially achieve healthy system buffer level sooner. After some time of adjustment, if the buffer level is trending toward healthy status, the Delta$_n$ is decreased. In some cases, block 480 could involve not changing the Delta$_n$.

Block 482 includes determining whether the current buffer level is greater than the stable buffer level. If the current buffer level is greater than the stable buffer level, then the buffer is considered in overflow and block 490 follows block 482. If the current buffer level is less than the stable buffer level, then the buffer is considered in underflow and block 495 follows block 482.

Block 490 includes reducing the PTS value by the Delta$_n$. Block 490 addresses the buffer potentially being in an overflow state.

Block 495 includes increasing the PTS value by the Delta$_n$. Block 495 addresses the buffer potentially being in an underflow state.

Figure 5:
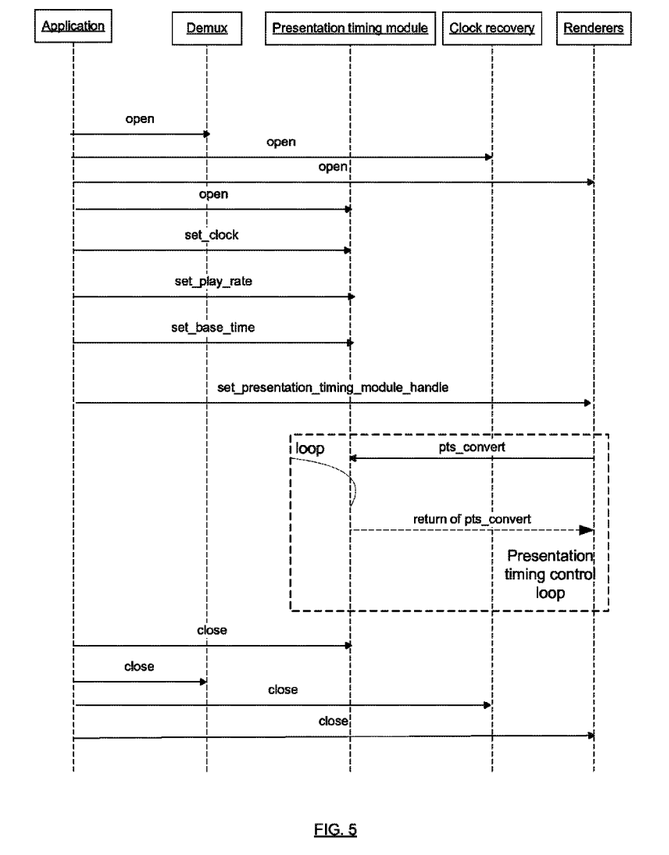
FIG. 5 depicts an example of module calling sequence.

FIG. 5 depicts an example of module calling sequence. An application can request use of presentation timing module in the case of a higher likelihood that an input signal is degraded (e.g., based on the medium of transmission of the input signal) or if signal corruption is detected. For example, input signals transmitted through territorial broadcast have more chance to be degraded than those transmitted through cable or wire. The application can be a player or browser with embedded media player, for example. The application can request opening of demultiplexer, clock recovery, renderers, and presentation timing module. The request to open presentation timing module allocates and initializes an instance of the presentation timing module. The application can issue a set_clock command to presentation timing module to cause setting a clock device handle. The application can issue a set_play_rate command to presentation timing module to set play rate. The play rate can be 1×, 2×, or other rates. The application can issue a set_base_time command to presentation timing module to set base time of the pipeline, where the base time is used to calculate the stream time. The application can issue a set_presentation_timing_module_handle command to the renderers and renderers can use this handle to call the presentation timing module. Each renderer can issue a request to presentation timing module to request conversion of a PTS value. The request for conversion of a PTS value can include a received PTS value, theoretical PTS value, and renderer buffer level. Return of pts_convert can be used to transfer the converted PTS to the renderer when the function call returns. After conversion of the PTS value(s), application can request to close demultiplexer, presentation timing module, clock recovery, and renderers.

Figure 6A:
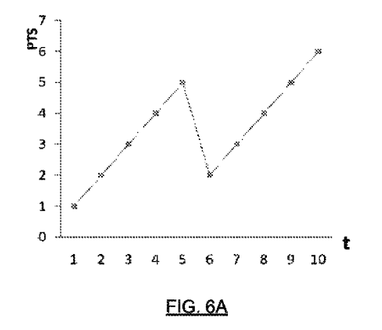
FIGS. 6A-6D depict examples of PTS patterns that can be corrected using some embodiments.
Figure 6B:
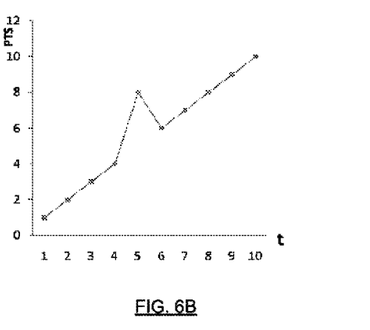
Figure 6C:
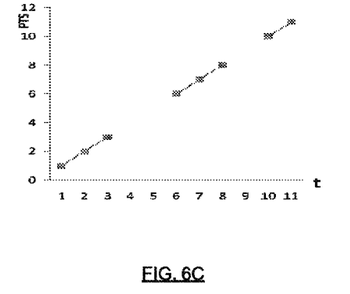
Figure 6D:
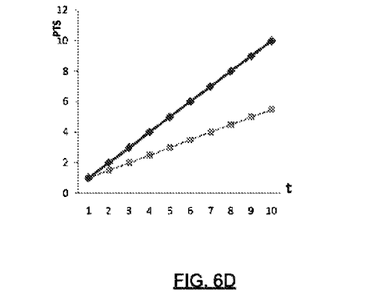

FIGS. 6A-6D depict examples of PTS patterns that can be corrected using some embodiments. In FIGS. 6A-6D, PTS value is in the vertical axis and time is in the horizontal axis. FIG. 6A depicts a PTS discontinuity case. FIG. 6B depicts a PTS odd points case. FIG. 6C depicts a PTS spare or signal lost case. FIG. 6D depicts a mismatched input bit-rate case.

In an embodiment, adjustment of PTS offset is based on a historical statistical data. The following Equation 1 can be used to determine when and how to correct a PTS value.

Equation 1:

$PTS_n$: PTS extracted from input stream $PTST_n$: Theoretical PTS for $PTS_n$ $PTST_n = \text{Number of frames displayed} * \frac{1}{\text{frame\_rate}}$, for video $PTST_n = \text{Number of samples displayed} * \frac{1}{\text{sample\_rate}}$, for audio $\delta_n = PTS_n - PTST_n$ $\delta'_n = \delta_{n+1} - \delta_n$ $LP(\delta'_N)$: $\delta'_N$ passed low pass filter $\bar{\delta}_N = 1/N \sum_{1}^{N} \delta_N$ where $[\delta'_1, \delta'_N]$ passed $LP$ $PTS_N(\text{out}) = PTS_N(\text{in}) - \bar{\delta}_N$ where $[\delta'_{N-n}, \delta'_N]$ passed $LP$ $PTS_N(\text{out}) = \text{Invalid}$ where one of $[\delta'_{N-n}, \delta'_N]$ not passed $LP$ A low pass filtering of $\delta'_N$ can be used to filter out odd points and detect discontinuities. Value $\delta'_N$ passes a low pass filter when $\delta'_N$ is less than a threshold value. If $\delta'_N$ passes low pass filtering, then an offset value $\bar{\delta}$ can be determined using $\delta'_N$. The offset value $\bar{\delta}$ can be calculated by statistical average of the gap between received PTS and theoretical PTS values and can be updated according to system status change. The offset value $\bar{\delta}$ can be negative or positive. The PTS value can be reduced by the offset value $\bar{\delta}$. The PTS value can be further adjusted using the adjustment factor described with regard to FIG. 4B.

There can be several trigger points for updating offset value $\bar{\delta}$:
1) On system startup and when system enters into STABLE state for the first time, the initial offset value can be calculated using Equation 1 above.
2) When too large a difference between PTS (out) from PTS (theory) is detected, the system can enter discontinuity state and the $\bar{\delta}$ can be reset. PTS converted will also be set to an invalid state in discontinuity state.
3) When system changes state from discontinuity to stable, $\bar{\delta}$ can be calculated using Equation 1
4) When buffer status exception detected, $\bar{\delta}$ is determined using Equation 1 and further adjusted by an adjustment factor (see FIG. 4B for calculation of this adjustment factor).

For example, considering the converted PTS can start from a small value because it should be aligned with stream time but the received PTS value can start from any value, then the $\bar{\delta}$ may be a large value. In the case of a discontinuity, received PTS will jump a lot and when the system re-enters stable state, the offset $\bar{\delta}$ will be re-calculated. The new $\bar{\delta}$ can be very different from its previous value to maintain linear converted PTS values.

An example of received PTS, converted PTS values, and $\bar{\delta}$ values are:

PTS received: 10000, 10001, 10002, 10003, 20040, 20041 . . .

PTS converted: 5, 6, 7, 8, 9, 10

$\bar{\delta}$ 9995, 9995, 9995, 9995, 20031, 20031

The buffer overflow/underflow adjustment factor described with regard to FIG. 4B can be a small value. The adjustment factor can be used to keep the buffer level as stable as possible if necessary. In the above example, if the buffer is trending to overflow, this factor may be 3, for example. In this case, the converted PTS can be further adjusted to: PTS converted: 2, 3, 4, 5, 6, and so forth.

A presentation timing module can enter discontinuous state if the $\delta'_N$ does not pass low pass filtering. Presentation timing module can re-enter stable state if some number of consecutive $\delta'_N$ pass low pass filtering.

In some embodiments, both audio and video streams are to be in stable state to apply PTS conversion. The amount of offset $\bar{\delta}$ for both audio and video PTS can be the same or the amount of audio offset can be almost equal to amount of video offset. The determined offset value $\bar{\delta}$ can be an average of audio and video offset values.

In various embodiments, a start up situation is addressed where there is a gap between audio and video PTS values. For example, the video PTS can be greater than the audio PTS:

Audio PTS: 1, 2, 3, 4, 5, 6, 7, 8, . . .
Video PTS: 4, 5, 6, 7, 8, 9, 10, . . .

There can be two manners of dealing with difference between PTS values for audio and video in this situation:
1) Audio played first with blank screen of video until audio PTS reaches first video PTS or
2) Discard the first 3 frame of audio and display the audio frame with PTS=4 and the first video frame (with a PTS of 4) at the same time.

PTS conversion can achieve either of the above effects by choosing right PTS conversion offset on start up. For example, if a PTS offset of 4 is used, the converted PTS of first 3 audio frames will be in the past and then discarded by renderer, so the second effect is achieved.

The following describes a manner of handling trick mode behavior. Both server side trick mode and local trick mode can involve scaling of presentation timestamp. Presentation timestamp is compared with real renderer time of corresponding frame to detect discontinuity or other situations. So the presentation timestamp may be the scaled in case of trick mode. In other words, a renderer can first convert a segment time to linear time and then linear time for scaling. The filter thresholds for error filtering can also be scaled accordingly when deal with trick mode, because the error is also scaled during PTS scaling.

Figure 7:
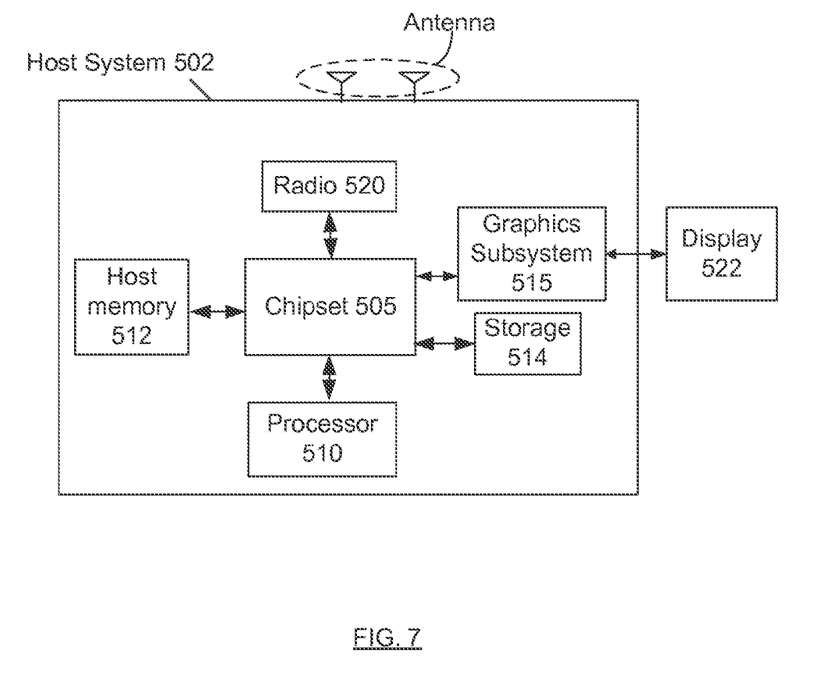
FIG. 7 depicts an example system that can use embodiments of the present invention.

FIG. 7 depicts an example system that can use embodiments of the present invention. Computer system 500 may include host system 502 and display 522. Computer system 500 can be implemented in a handheld personal computer, mobile telephone, set top box, or any computing device. Host system 502 may include chipset 505, processor 510, host memory 512, storage 514, graphics subsystem 515, and radio 520. Chipset 505 may provide intercommunication among processor 510, host memory 512, storage 514, graphics subsystem 515, and radio 520. For example, chipset 505 may include a storage adapter (not depicted) capable of providing intercommunication with storage 514. In some implementations, chipset 505, processor 510, and graphics subsystem 515 can be implemented in a single system on chip (SoC).

Processor 510 may be implemented as Complex Instruction Set Computer (CISC) or Reduced Instruction Set Computer (RISC) processors, x86 instruction set compatible processors, multi-core, or any other microprocessor or central processing unit.

Host memory 512 may be implemented as a volatile memory device such as but not limited to a Random Access Memory (RAM), Dynamic Random Access Memory (DRAM), or Static RAM (SRAM). Storage 514 may be implemented as a non-volatile storage device such as but not limited to a magnetic disk drive, optical disk drive, tape drive, an internal storage device, an attached storage device, flash memory, battery backed-up SDRAM (synchronous DRAM), and/or a network accessible storage device.

Graphics subsystem 515 may perform processing of images such as still or video for display. An analog or digital interface may be used to communicatively couple graphics subsystem 515 and display 522. For example, the interface may be any of a High-Definition Multimedia Interface, DisplayPort, wireless HDMI, and/or wireless HD compliant techniques. Graphics subsystem 515 could be integrated into processor 510 or chipset 505. Graphics subsystem 515 could be a stand-alone card communicatively coupled to chipset 505.

In various embodiments, processor 510 or graphics subsystem 515 can be configured to perform audio-video synchronization as described herein.

Radio 520 may include one or more radios capable of transmitting and receiving signals in accordance with applicable wireless standards such as but not limited to any version of IEEE 802.11 and IEEE 802.16. For example, radio 520 may include at least a physical layer interface and media access controller.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multicore processor. In a further embodiment, the functions may be implemented in a consumer electronics device.

Embodiments of the present invention may be implemented as any or a combination of: one or more microchips or integrated circuits interconnected using a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A computer-implemented method comprising:
   determining whether audio-video synchronization can take place based in part on changes to received presentation time stamps and
   permitting adjustment of a received presentation timestamp value when audio-video synchronization is permitted to take place, wherein audio-video synchronization is permitted to take place in response to a difference between a presentation time stamp and a theoretical presentation time stamp not changing more than a threshold for a period of time, and
   wherein permitting adjustment of the presentation timestamp value comprises permitting adjustment of the presentation timestamp value by an amount based in part on a difference between the presentation time stamp value and a theoretical presentation time stamp value and comprising:
   reducing the amount in response to a difference between a system buffer level and a stable buffer level being greater than a second threshold and the difference between the system buffer level and the stable buffer level decreasing or being steady compared to a prior difference between the system buffer level and the stable buffer level and increasing the amount in response to the difference between the system buffer level and the stable buffer level being greater than the second threshold and the difference between the system buffer level and the stable buffer level increasing compared to the prior difference between the system buffer level and the stable buffer level.

2. The method of claim 1, wherein the presentation timestamp value corresponds to at least one of an audio presentation timestamp value or a video presentation timestamp value.

3. The method of claim 1, further comprising, when audio-video synchronization is not permitted to take place, permitting audio to be played back at a sample rate and video to be played back at a frame rate instead of being controlled by a presentation timestamp.

4. The method of claim 1, wherein the difference between the presentation time stamp and the theoretical presentation time stamp not changing more than the threshold for the period of time comprises:

a difference between delta1 and delta0 not changing more than the threshold and a difference between delta2 and delta1 not changing more than the threshold, wherein delta0 comprises a difference between a presentation time stamp and a theoretical presentation time stamp at time 0, delta1 comprises a difference between a presentation time stamp and a theoretical presentation time stamp at time 1, and delta2 comprises a difference between a presentation time stamp and a theoretical presentation time stamp at time 2.

5. The method of claim 1, wherein permitting adjustment of the presentation timestamp value by the amount comprises:

reducing the presentation timestamp value by the amount in response to the system buffer level exceeding the stable buffer level or increasing the presentation timestamp value by the amount in response to the system buffer level not exceeding the stable buffer level.

6. An apparatus comprising:
at least one hardware logic comprising:
a video renderer;
a video renderer buffer;
an audio renderer;
an audio renderer buffer; and
a presentation timing module to receive presentation time stamps and video renderer buffer level and audio renderer buffer level of the video renderer and audio renderer, wherein the presentation timing module is to determine whether modification of a presentation time stamp is permitted, wherein modification of the presentation time stamp is permitted in response to a change in a difference between the presentation time stamp and a theoretical presentation time stamp not exceeding a threshold for a period of time, and wherein the presentation timing module is to permit modification of the presentation time stamp by an amount in response to a determination that modification of the presentation time stamp is permitted, the amount is based in part on a difference between a presentation time stamp value and a theoretical presentation time stamp value, the presentation timing module is to reduce the amount in response to a decreasing or steady difference between a current buffer level and a stable buffer level, and the presentation timing module is to increase the amount in response to an increasing difference between the current buffer level and the stable buffer level.

7. The apparatus of claim 6, wherein the difference between the presentation time stamp and the theoretical presentation time stamp not exceeding the threshold for the period of time comprises:

a difference between delta1 and delta0 does not exceed the threshold and a difference between delta2 and delta1 does not exceed the threshold, wherein delta0 comprises a difference between a presentation time stamp and a theoretical presentation time stamp at time 0, delta1 comprises a difference between a presentation time stamp and a theoretical presentation time stamp at time 1, and delta2 comprises a difference between a presentation time stamp and theoretical presentation time stamp at time 2.

8. The apparatus of claim 6, wherein the presentation timing module is to:

reduce the presentation timestamp value by the amount in response to the current buffer level exceeding the stable buffer level or increase the presentation timestamp value by the amount in response to the current buffer level not exceeding the stable buffer level.

9. The apparatus of claim 6, wherein the presentation timing module is to cause audio to be played back at a sample rate and video to be played back at a frame rate instead of use of a presentation time stamp in response to a difference between a second presentation time stamp and an associated theoretical time stamp being more than the threshold.

10. A system comprising:
a wireless network interface;
a display; and
a processor configured to:
determine whether to permit audio-video synchronization using both a system time clock and presentation time stamps based in part on whether differences between the presentation time stamps and theoretical presentation time stamps of at least one of a video or audio stream do not change by more than a threshold value over a period of time and in response to permission for audio-video synchronization using both the system time clock and the presentation time stamps, the processor is to determine an amount to adjust a presentation time stamp of at least one of the video or the audio stream, wherein the amount is based in part on a difference between a presentation time stamp value and a theoretical presentation time stamp value, the processor is to reduce the amount in response to a steady or reduced buffer overflow or underflow condition, the processor is to increase the amount in response to increased buffer overflow or underflow condition, and the processor is to reduce the presentation timestamp value by the amount in response to a current buffer level exceeding a stable buffer level or increase the presentation timestamp value by the amount in response to the current buffer level not exceeding the stable buffer level.

11. The system of claim 10, wherein the differences between the presentation time stamps and the theoretical presentation time stamps of at least one of the video or the audio stream do not change by more than a threshold value over a period of time comprises:

- a difference between delta1 and delta0 does not exceed the threshold and
- a difference between delta2 and delta1 does not exceed the threshold, wherein
    - delta0 comprises a difference between a presentation time stamp and theoretical presentation time stamp at time 0,
    - delta1 comprises a difference between a presentation time stamp and theoretical presentation time stamp at time 1, and
    - delta2 comprises a difference between a presentation time stamp and theoretical presentation time stamp at time 2.

\* \* \* \* \*